2,871,424
Patented Jan. 27, 1959

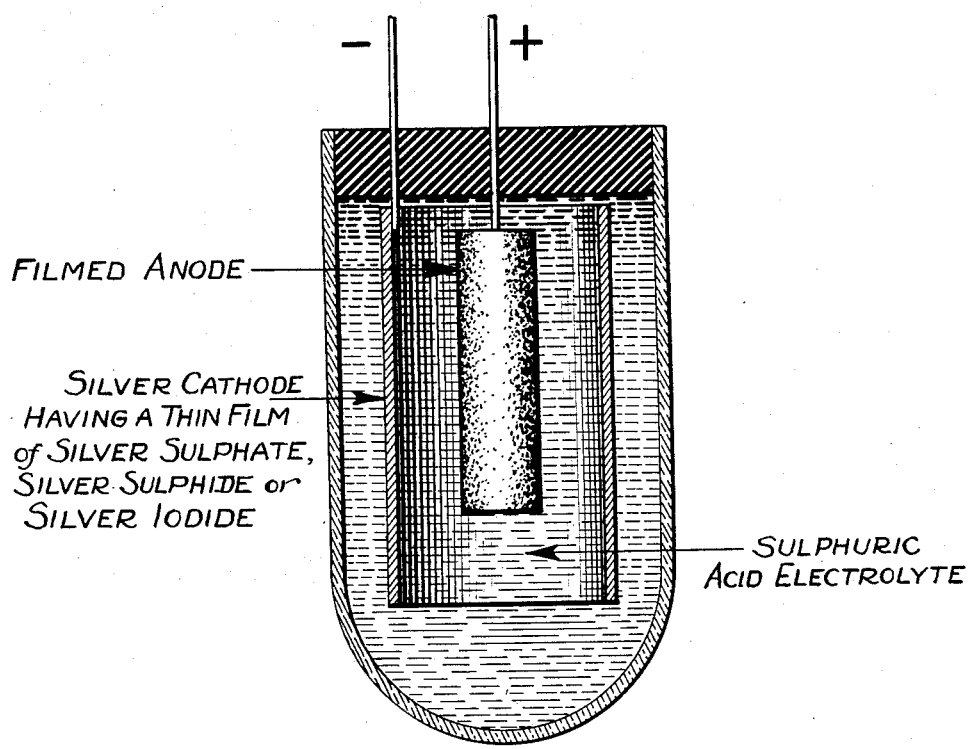

2,871,424

ELECTROLYTIC CAPACITOR

Oliver S. Aikman, Libertyville, Ill., assignor to Fansteel Metallurgical Corporation, North Chicago, Ill., a corporation of New York Application March 9, 1953, Serial No. 341,322

9 Claims. (Cl. 317—230)

This application is a continuation in part of application Serial No. 309,337, filed September 12, 1952, now abandoned.

This invention relates to an electrolytic capacitor of the polarized type having a film-forming metal as the anode, silver as the cathode, and aqueous electrolyte principally of sulfuric acid.

In the electrolytic capacitor of the present invention, the anode material may be a metal or alloy having a stable asymmetrically conducting film. Thus tantalum, columbium, vanadium, antimony, bismuth, magnesium and nickel may be the anode and may be used in any concentration of sulfuric acid electrolyte. Zinc, cadmium and iron may be used with fuming sulfuric acid.

In a capacitor of the above type, particularly where the capacitor is sealed in a casing or container, it has been found that a phenomenon known in the trade as "aging" deleteriously affects the performance characteristics of the capacitor. This "aging" manifests itself in the reduction of the effective value of capacitance of the capacitor and also manifests itself by increasing the effective resistance of the capacitor in a circuit. In general, "aging" results in an instability of capacitor characteristic and effectively reduces the operating life thereof.

I believe that a substantial factor in "aging" of an electrolytic capacitor of the type previously described is the direct current leakage occurring when the capacitor is in a live circuit. When current leaks through the capacitor (the complete elimination of leakage current in an electrolytic capacitor is practically impossible), a certain amount of energy must be absorbed in the capacitor.

In a capacitor having sulfuric acid as the electrolyte, as described above, substantially the only positive ions present in the electrolyte and hydrogen. The electrical energy absorbed or lost in the capacitor is utilized, at least in part, to dissociate hydrogen from the electrolyte and causes the hydrogen to evolve at the cathode. Generally, the hydrogen clings to the surface of the cathode and tends to reduce the effective area thereof. The presence of hydrogen at the cathode surface causes polarization, increases the effective resistance of the capacitor, and also reduces the effective area of the capacitor. While a capacitor whose electrolyte and electrodes are open to the atmosphere may not suffer so much from this phenomenon, the effect is substantial and damaging in the case of a capacitor which is hermetically sealed to the atmosphere and which is designed to operate for long periods of time either on continuous or intermittent duty.

I have discovered that this aging of the capacitor will be reduced, eliminated, or at least substantially minimized by providing on the silver cathode surface a thin electrically conducting stable film of silver sulfate, silver sulfide, or silver iodide.

One theory by which the prevention of hydrogen liberation can be explained is that the compound covering the cathode raises the over-potential of cathodic gases so that during operation under normal voltage conditions there will be practically no evolution of gases at the cathode. In the example where the cathode has a sulfide or sulfate film, reduction of the sulfide or sulfate film will take place in preference to gas evolution since the silver ion is more readily discharged than the hydrogen ion. This reduction of the film takes place at such a slow rate that the film can, for all practical purposes, be considered as permanent.

Another advantage resulting from the use of the above-mentioned cathode films is that the cathode is wetted more fully than when the cathode is unfilmed, thereby resulting in a capacitor having a higher effective capacity. Silver which is not coated with the above compounds is not readily wetted by an electrolyte, such as dilute sulfuric acid. This poor wetting quality results in a lower capacitance between the cathode surface and the electrolyte relative to a cathode surface which is readily wetted. The cathode to electrolyte capacitance is in series with the main capacitance between the electrolyte and anode. The over-all capacitance of an electrolytic capacitor is therefore lowered when the cathode to electrolyte capacitance is decreased, due to an insufficient wetting of the silver by the electrolyte.

The metallic compounds identified above are electrically conducting although their conductivities are of a decidedly lower order than silver. The film at the anode is the only part of the capacitor that should have theoretically infinite resistance. For good capacitor characteristics, it is of the utmost importance that the current paths to the film from the anode and cathode should have low resistance. Hence, the silver compound layer or film upon the silver cathode surface is in the current path and should have a low resistance. To maintain desirable capacitor characteristics, therefore, it is important that the thickness of the cathode film or layer be controlled, particularly with regard to maximum thickness, and that it be substantially stable in the electrolyte.

The electrically conducting film or layer of silver compound on the cathode is very thin, in the order of dimensions up to a maximum of about 0.0001 inch. The preferred films have a thickness varying from molecular thickness to about 5000 angstrom units. The maximum thickness of the film or layer which may be used in accordance with my invention can be determined by the effects of the film on the capacitor. A polarized capacitor having a film of suitable thickness on the cathode will have a somewhat higher initial equivalent series resistance than the same polarized capacitor without treatment of the cathode. However, the treated capacitor, after use, soon changes so that its equivalent series resistance drops to about the initial resistance of the untreated capacitor. The untreated capacitor exhibits aging so that its initial resistance steadily increases. A treated capacitor having an excessively thick film of metal compound on the cathode does not exhibit the desired resistance decrease nor attain the desired low equivalent series resistance of the properly treated capacitor.

In practice, the desirable maximum film thickness may most conveniently be determined by sample treated capacitors having cathodes with films formed under known conditions.

I have found that when silver is made the anode (the reverse of its function in the capacitor) in a sulfuric acid electrolyte, and about 0.6 coulomb of electricity per square inch of silver surface is passed through the electrolyte and cathode, the desired amount of silver sulfate deposits on the cathode.

The quantity of electricity given above for depositing a proper thickness of silver sulfate may be increased by as much as about 50% without producing an undesirably thick cathode film. A smaller quantity of electricity may be used effectively and still provide beneficial results. However, about 1 coulomb of electricity per square inch of silver surface is the maximum recommended. It is understood that the above recommended quantities of electricity represent the useful energy. If the rate of current flow is excessive or if the voltage is excessive, some evolution of hydrogen may result. This represents a non-useful current flow.

The silver sulfate film may also be formed in an aqueous solution of sodium sulfate as electrolyte rather than sulfuric acid. The same current considerations for depositing the proper thickness of silver sulfate apply. The silver sulfide film may be formed in the same manner by using an aqueous solution of sodium sulfite as electrolyte. The current limitations also apply here for controlling the amount of silver sulfide deposited on the silver electrode.

A silver iodide film may be obtained by replacing the chlorine with iodine in a silver chloride film. For example, a silver electrode is disposed in an aqueous solution of sodium chloride as electrolyte. The silver is first made the anode, and a current of electricity is passed through the electrolyte in the amount as given above in forming the sodium sulfate film. The filmed silver electrode is then washed with an alcoholic solution of potassium iodide. It will be found that the silver electrode now has a film of silver iodide thereover, the chlorine combining with the potassium. The procedure outlined above is well known in connection with the manufacture of a metal master record for making disc records for phonographs.

A silver iodide film may be also be formed in a sodium iodide solution in the manner corresponding to formation of the silver sulfate film; i. e., by passing no more than 1 coulomb of electricity per square inch of silver surface through the electrolyte and silver electrode, with the silver electrode utilized as an anode.

In order that the invention may be understood it will now be explained in connection with the drawing, wherein a simple diagrammatic showing of a polarized capacitor embodying the present invention is illustrated. No attempt is made to show any mechanical details either as to the electrode structure or as to the nature of the housing for the capacitor. The cathode may or may not form the housing for the electrolyte.

Referring to the drawings, the anode is of a suitably formed metal or alloy previously mentioned as susceptible to use as a film-forming anode. It is understood that the material of which the anode is made must be insoluble in the electrolyte. As an example, the anode may be a spongy mass of tantalum having a suitable film formed thereon, all this being well known in the art.

The electrolyte is an aqueous solution of sulfuric acid. The concentration may follow conventional practice and is susceptible to side variation depending upon desired characteristics.

The electrolyte may be have thickening agents, such as gelatine, added thereto if desired.

The capacitor has a silver cathode of any desired form and area. This cathode may either form the housing for the capacitor or may be immersed in the electrolyte and have no housing function for the capacitor.

The capacitor includes a receptacle or housing either of the cathode metal or of separate material such as glass or other inert material. The finished capacitor may include a plug or seal of insulating material to seal the capacitor. Leads to the electrodes are provided.

The capacitor so far described is a conventional capacitor which, as has been previously pointed out, exhibits undesirable aging effects. In accordance with this invention, I provide a thin coating of silver sulfate, silver sulfide or silver iodide on the surface of the silver electrode. It is immaterial whether the film is applied to the silver cathode prior to or subsequent to its incorporation as a cathode electrode in the polarized capacitor. The silver electrode thus treated may be handled in a conventional manner, including exposure to light. The darkening of the light-exposed film of silver iodide has no substantial effect on the characteristics of the capacitor.

It is understood that the thickness of the film will be controlled as, for example, by control of the quantity of electricity used on the silver cathode when temporarily reversed to function as an anode. As previously pointed out, a preferred quantity of electricity is about 0.6 coulomb per square inch of silver surface to be treated, although as much as 1 coulomb may be used. The electrolyte has sufficient ions, both positive and negative, to provide a low resistance path to the silver surface. The cooperating electrode, temporary cathode, will of course provide good electrical connection to the electrolyte.

As an example, the silver electrode (capacitor cathode) prior to its incorporation in the capacitor may be disposed in an aqueous solution of sodium sulfate or the sulfate of any other alkali metal. A temporary cathode of any metal including filmed metals as tantalum and aluminum is provided, and no more than the recommended quantity of electricity passed through in such direction that the silver electrode to be treated is temporarily an anode. A layer of silver sulfate then appears on the silver electrode of proper thickness.

The silver sulfide film may be obtained by the same treatment in a sodium sulfite electrolyte, as previously described. The silver iodide film may be obtained also in the manners previously disclosed.

A simple treatment for an assembled preferred polarized capacitor of silver, tantalum and an aqueous electrolyte of sulfuric acid in accordance with the invention is as follows: The capacitor is assembled in a normal manner with an untreated silver cathode and a filmed tantalum anode. The polarized capacitor may be sealed. Thereafter, the finished polarized capacitor is connected in a direct current treating circuit, the capacitor polarity being reversed from its normal polarity. In other words, in the treating circuit, the capacitor cathode is temporarily the anode and the tantalum anode is temporarily the cathode. In this reverse direction, the film on the tantalum is conductive. No more than the recommended quantity of electricity is permitted to flow through the temporarily reversed capacitor. A silver sulfate film of desired thickness will then be formed on the silver electrode.

The shelf life of the capacitor embodying the invention is in no way impaired. The polarized capacitor having the silver sulfate film on the cathode may be used in a normal manner at any time. This is also true of a capacitor having a silver sulfide or silver iodide film in accordance with the invention.

As an exmaple, polarized capacitors having filmed spongy tantalum anodes and silver cathodes in conventional sulfuric acid electrolyte, with the silver treated on reverse current of about 0.6 coulomb per square inch of silver cathode surface, showed substantial improvements over the same untreated capacitors. In accelerated life tests, the treated capacitors had no appreciable change in capacitance and increased comparatively very little in equivalent series resistance.

By virtue of the treatment, shrinkage on a run of capacitors during manufacture may be greatly reduced if tolerances are close. Production yields are thus greatly increased.

The term "equivalent series resistance" is well known and widely used to denote the excellence of a capacitor. This indicates the value of resistance in series, with a perfect capacitor having the same capacitance as a capacitor being considered which will duplicate the power factor of the capacitor being considered. (See, for example, Terman's 1943 edition of "Radio Engineers' Hand Book," pages 109 and 110.) It is clear that the better a condenser is, the lower will be its equivalent series resistance.

I claim:

1. A polarized capacitor substantially free of aging effects, said capacitor comprising a silver cathode, a filmed anode, an aqueous solution of sulfuric acid as electrolyte, said cathode having thereon an adherent thin film of a compound of silver insoluble in the electrolyte, said compound being selected from the class consisting of silver sulfate, silver sulfide and silver iodide, said adherent film being thin enough so that the initial equivalent series resistance of the capacitor is higher than the capacitor without the adherent film, said equivalent series resistance dropping with capacitor use.

2. The capacitor according to claim 1 wherein the compound is silver sulfate.

3. The capacitor according to claim 1 wherein the compound is silver sulfide.

4. The capacitor according to claim 1 wherein the compound is silver iodide.

5. A polarized capacitor substantially free of aging effects, said capacitor comprising a silver cathode, a filmed tantalum anode, and an aqueous solution of sulfuric acid as electrolyte, said silver cathode having thereon an adherent thin film of a silver compound selected from the class consisting of silver sulfate, silver sulfide and silver iodide, said adherent film being thin enough so that the initial equivalent series resistance of the capacitor is higher than the capacitor without the adherent film, said equivalent series resistance dropping with capacitor use.

6. A polarized capacitor substantially free of aging effects, said capacitor comprising a silver cathode, a filmed tantalum anode, and an aqueous solution of sulfuric acid as electrolyte, said silver cathode having thereon an adherent thin film of a silver compound selected from the class consisting of silver sulfate, silver sulfide and silver iodide, said film having been formed by disposing the silver in an electrolyte containing negative ions corresponding to the nonmetallic part of the compound, and using a current of electricity of no more than about 1 coulomb per square inch of silver surface passed in such direction that the silver cathode temporarily functions as an anode.

7. The capacitor according to claim 6 wherein the compound is silver sulfate which has been formed in a sodium sulfate electrolyte.

8. The capacitor according to claim 6 wherein the compound is silver sulfide which has been formed in a sodium sulfite electrolyte.

9. The capacitor according to claim 6 wherein the compound is silver iodide which has been formed in a sodium iodide electrolyte.

References Cited in the file of this patent

UNITED STATES PATENTS

| | | |
|---|---|---|
| 2,368,688 | Taylor | Feb. 6, 1945 |
| 2,616,953 | Booe | Nov. 4, 1952 |
| 2,617,863 | Stinson | Nov. 11, 1952 |
| 2,670,395 | Audubert et al. | Feb. 23, 1954 |
| 2,710,369 | Booe | June 7, 1955 |

OTHER REFERENCES

"Zeitschrift für Elektrochemie," vol. 34 (1928), pages 31 and 32 of article by Liebreich et al.